United States Patent
Kalbag

(10) Patent No.: US 7,545,761 B1
(45) Date of Patent: Jun. 9, 2009

(54) SESSION CLASSIFICATION FOR DIFFERENTIATED PREPAID ACCOUNTING

(75) Inventor: Rohit S. Kalbag, Bridgewater, NJ (US)

(73) Assignee: Cellco Partnership, Bedminster, NJ (US)

( * ) Notice: Subject to any disclaimer, the term of this patent is extended or adjusted under 35 U.S.C. 154(b) by 618 days.

(21) Appl. No.: 11/147,324

(22) Filed: Jun. 8, 2005

(51) Int. Cl.
- H04B 7/00 (2006.01)
- H04W 4/00 (2006.01)
- H04M 11/00 (2006.01)
- H04M 15/00 (2006.01)

(52) U.S. Cl. .................. 370/310; 370/338; 455/406; 379/114.2; 379/114.01

(58) Field of Classification Search ................ 370/310, 370/338; 455/406; 379/114.2, 114.01
See application file for complete search history.

(56) References Cited

U.S. PATENT DOCUMENTS

| | | | |
|---|---|---|---|
| 5,359,182 | A | 10/1994 | Schilling |
| 5,826,185 | A | 10/1998 | Wise et al. |
| 6,029,062 | A | 2/2000 | Hanson |
| 6,036,090 | A | 3/2000 | Rahman et al. |
| 6,058,300 | A | 5/2000 | Hanson |
| 6,149,353 | A | 11/2000 | Nilsson |
| 6,185,198 | B1 | 2/2001 | LaDue |
| 6,185,414 | B1 | 2/2001 | Brunner et al. |
| 6,236,851 | B1 | 5/2001 | Fougnies et al. |
| 6,298,250 | B1 | 10/2001 | Nilsson |
| 6,330,443 | B1 | 12/2001 | Kirby |
| 6,434,378 | B1 | 8/2002 | Fougnies |
| 6,453,158 | B2 | 9/2002 | Donovan et al. |
| 6,473,610 | B1 | 10/2002 | Nilsson |
| 6,487,401 | B2 | 11/2002 | Suryanarayana et al. |
| 6,496,690 | B1 | 12/2002 | Cobo et al. |
| 6,738,779 | B1 * | 5/2004 | Shapira ..................... 707/101 |
| 6,741,687 | B1 | 5/2004 | Coppage |
| 6,829,473 | B2 | 12/2004 | Raman et al. |
| 7,043,228 | B2 * | 5/2006 | Uppal et al. ................ 455/406 |
| 2002/0068545 | A1 * | 6/2002 | Oyama et al. ............... 455/406 |
| 2002/0141386 | A1 * | 10/2002 | Minert et al. ............... 370/352 |
| 2003/0008635 | A1 * | 1/2003 | Ung et al. ................... 455/408 |

(Continued)

OTHER PUBLICATIONS

U.S. Appl. No. 10/247,034, Clare et al.

(Continued)

*Primary Examiner*—Vincent P Harper
*Assistant Examiner*—Ariel Balaoing
(74) *Attorney, Agent, or Firm*—McDermott Will & Emery LLP

(57) ABSTRACT

Session level classification of wireless packet data communications enables differentiated duration-based accounting. In a network offering prepaid services, for example, an applicable accounting policy is identified each time a user requests a new session. Different session classifications are possible under the identified policy. For example, if the prepaid subscriber also subscribes to a push-to-talk (PTT) service, the policy enables classification of each session as either PTT or non-PTT. A different policy would apply if the prepaid subscriber did not subscribe to the PTT service. A network element serving the mobile station during the session monitors packets, until it can detect a packet enabling appropriate classification under the applicable policy. The prepaid platform bases its accounting on the session classification. For a prepaid subscriber with PTT service, for example, a non-PTT session receives normal prepaid treatment based on session duration, whereas packet transport for a PTT session may be free.

7 Claims, 6 Drawing Sheets

U.S. PATENT DOCUMENTS

| | | | |
|---|---|---|---|
| 2003/0108057 A1* | 6/2003 | Suzuki et al. | 370/401 |
| 2003/0121967 A1* | 7/2003 | Goldberg et al. | 235/375 |
| 2004/0009761 A1 | 1/2004 | Money et al. | |
| 2004/0019539 A1* | 1/2004 | Raman et al. | 705/29 |
| 2004/0028055 A1 | 2/2004 | Madour et al. | |
| 2004/0048600 A1* | 3/2004 | Madour et al. | 455/408 |
| 2004/0102182 A1* | 5/2004 | Reith et al. | 455/410 |
| 2004/0106393 A1 | 6/2004 | Chowdhury et al. | |
| 2004/0148384 A1 | 7/2004 | Ramakrishnan et al. | |
| 2004/0156340 A1 | 8/2004 | Madour | |
| 2004/0196826 A1 | 10/2004 | Bao et al. | |
| 2004/0205212 A1 | 10/2004 | Huotari et al. | |
| 2004/0208153 A1* | 10/2004 | Mizell et al. | 370/338 |
| 2004/0258028 A1* | 12/2004 | Hossain et al. | 370/335 |
| 2006/0025122 A1* | 2/2006 | Harris et al. | 455/419 |

OTHER PUBLICATIONS

Brochure No. SurePay May 2002; "MiLife™ SurePay® Solutions Suite"; Lucent Technologies Bell Labs Innovations; c. 2002; Lucent Technologies; United Kingdom.

"cdma2000 Wireless IP Network Standard: PrePaid Packet Data Service" 3rd Generation Partnership Project 2 "3GPP2" 3GPP2 X.S0011-006-C, Aug. 2003, 35 pages.

"cdma2000 Wireless IP Network Standard: Accounting Services and 3GPP2 RADIUS VSAs" 3rd Generation Partnership Project 2 "3GPP2" 3GPP2 X.S0011-005-C, Aug. 2003, 48 pages.

Chiba, M. et al. "Dynamic Authorization Extensions to Remote Authentication Dial In User Service (RADIUS)", Microsoft Corporation, Jul. 2003, © The Internet Society p. 1-30.

Perkins, C. ed. "IP Mobility Support for IPv4" Nokia Research Center, Jan. 2002, © The Internet Society, p. 1-98.

Glass, S. "Registration Revocation in Mobile IPv4" Cisco Systems, Aug. 2003, © The Internet Society, p. 1-33.

* cited by examiner

SESSION CLASSIFICATION FOR DIFFERENTIATED PREPAID ACCOUNTING

TECHNICAL FIELD

The present teachings relate to techniques, network equipment and software to provide packet data services offered via a public mobile wireless communication network, with classification of the packet data communications at a session level for different packet service applications or the like and attendant different duration based accounting treatments for the differently classified sessions.

BACKGROUND

In recent years, mobile wireless communications have become increasingly popular. Initial implementations of mobile wireless communications, for example in the form of cellular telephone networks, supported circuit switched voice communication services. Today wireless carriers also offer packet data communication services to their mobile customers.

Prepaid communications services, in which a customer or subscriber prepays for usage of a communications system, have become increasingly popular. Such services now encompass an array of mobile wireless communications. In an example of a prepaid wireless service, the customer may purchase blocks of time for making voice telephone calls via a cellular telephone network. Upon connecting to the wireless communications network, the customer account is authorized and authenticated, and the network allows a call to proceed. The network monitors the customer's usage time and decrements from the customer's account. If the account becomes depleted, the system can either prompt the customer to purchase more time, or the system can terminate the call. Prepaid wireless communications system enable the customer to budget an amount of airtime that will be used during a certain period of time, and to insure that the budget will not be exceeded unless the customer purchases more airtime. The wireless service provider likes this type of service, because the carrier receives payment in advance and need not run the risk that the customer will default on a bill, as sometimes happens with postpay type billing services.

Service providers have extended their prepaid offerings to encompass various wireless data services. For example, commonly assigned U.S. patent application Ser. No. 10/247,034 to Varsha Clare et al. discloses a "Method and System for Processing Prepaid Wireless Data Communications." As disclosed there, a receiving node, such as a packet data serving node (PDSN), handles packet data calls and interacts with an administration system, including an authentication, authorization and accounting (AAA) server and a prepaid server platform. Upon receiving a packet data call, the PDSN accesses the AAA server to obtain call access authorization. For a prepaid customer, with the authorization, the PDSN also receives a prepaid volume record indicating an amount of prepaid units available for use by the customer and processing instructions, from the server platform for the prepaid service. The PDSN then enables the wireless data call to proceed on the network, while monitoring the call and decrementing the available prepaid units from the prepaid volume record associated with the customer. If the available prepaid units reach a predetermined level, as indicated in the processing instructions, the PDSN notifies the prepaid service server that the predetermined level has been reached. The server system can respond either with an updated available balance, which enables the PDSN to allow the call to continue, or with instructions to the PDSN to terminate the call.

As another example, US published patent application no. 2004/0106393 relates to "Methods, systems and program products for supporting prepaid service within a communication network," specifically for a prepaid packet data communication service. A prepaid client, for example in a foreign agent (FA) PDSN or in a home agent (HA), sends a resource request for prepaid resources through the network to a prepaid server. In response, the prepaid server transmits a resource response that specifies a quota of prepaid resources. The quota is no greater than the prepaid account balance of the subscriber. The resource response also includes a resource usage threshold at which the prepaid client will provide notification and will update the account to reflect a portion of the prepaid account balance that has been consumed.

Hence, a modern prepaid data (PPD) service allows the subscriber to pay for packet data service prior to usage. In an actual deployment, when a subscriber establishes a prepaid account with the wireless service provider, for packet data service, appropriate provisioning is made at the carrier's Authentication, Authorization and Accounting (AAA) and prepaid server platforms, to allow the subscriber to receive prepaid data service. The AAA server acts as a proxy for the prepaid user's Remote Authentication Dial-User Service (RADIUS) messages, except for accounting messages. The AAA server proxies the RADIUS messages to the provisioned prepaid service platform. The AAA server adds relevant information (e.g., MIP attributes) to the received RADIUS messages from prepaid service platform.

The Packet Data Serving Node (PDSN) and the Home Agent (HA) act as TIA-835-C prepaid clients. TIA-835-C is a standard for a 3GPP2 for a cdma2000 Wireless IP Network. In relevant part, that standard specifies a prepaid packet data service. The prepaid service platform acts as an TIA-835-C prepaid server (PPS). When the subscriber initiates a prepaid call, the AAA server proxies the RADIUS Access-Request to the prepaid service platform. The prepaid service platform checks the subscriber's balance, and prepaid and session termination capabilities of the serving PDSN and the customer's HA, and grants either the PDSN (for SIP sessions) or the HA (for MIP sessions) prepaid client (PPC) duties by providing a quota to the node serving as the PPC for the particular call.

The PPC carries out quota replenishment after threshold expiry using RADIUS online Access-Requests, which contain the amount of duration/volume used for that session. The PPC will release resources when the quota is not replenished and runs out, essentially ending the data session. When the subscriber ends a packet data session or the PPC is remotely instructed to tear down the session (by the prepaid platform), the PPC sends the information regarding the duration/volume used during the session, via the AAA server, to the prepaid platform.

The deployment using this standard-based technology tends to treat all packet data communications the same, for prepaid accounting purposes. However, packet data usage differs, typically with different applications that utilize the packet transport; and service providers may want to differentiate for billing purposes. Typical data communication applications include web browsing, application downloading and e-mail communication. However, as the speeds of packet-switched communications equipment and the speed of processors have increased, a variety of applications have emerged that utilize IP packet transport as an alternative bearer for voice communications. Such applications are often referred to as "Voice over IP" or "VoIP" services. Although originally developed for wireline network transport through the Internet and through wireline intranets, VoIP services are now migrating onto the packet transport networks deployed for the wireless domain. For example, it is now being proposed to use packet communications and VoIP to provide a push-to-talk (PTT) wireless broadcast communication service. It is desirable to differentiate VoIP communications, like PTT, from other packet data communications for prepaid billing purposes.

However, under the TIA-835-C standard for the prepaid packet data service, the only differentiated charging mechanism provided is for the exemption of traffic being sent or received from a specified set of IP addresses from volume-based charging. There is no differentiated charging mechanism that can be used with duration-based prepaid accounting in this standard.

United States Patent Application Publication no. 20040148384 to Ramakrishnan et al. discloses a middleware platform for analyzing and rating packet communications, based on a customer's prepaid account information from a Service Control Point (SCP) and profile information provided by a rating service implemented within the middleware platform. The middleware platform includes a classification engine, which apparently classifies each packet based on information from various levels of the IP protocol stack. The classification engine develops a decision tree for the customer's data communications based on a rating plan provided by the user's profile. An analyzer captures and delimits each packet of the customer's data communication by type, in accord with the decision tree. The platform then monitors each type of data flow within a user's session and provides usage statistics, e.g. for prepaid service control or post-pay type billing.

United States Patent Application Publication No. 20040028055 to Madour et al. teaches differentiated accounting in a packet data network. A Packet Data Service Node (PDSN) performs accounting functions based on the IP address of a customer's Mobile Station. However, the PDSN can also provide differentiated accounting based on information related to a Corresponding Node (CN), that is to say the terminal or server with which the customer communicates over a packet data session. Accounting can be differentiated based on the other party's IP address, and possibly the application ID or port number, and/or the Quality of Service (QoS) for that session. The PDSN counts the traffic associated with the other party's IP address, and reports that traffic, along with the that party's information to a AAA server, and accounting can then be applied based on the other party's information. For example, a lower rate may be charged for downloading of game software from the service provider's own service than is charged for data communications with another mobile terminal. The Publication suggests that the accounting may be prepaid or post-pay. The background of this document discusses an earlier solution in which the PDSN maintained a table of destination IP addresses, and applied special accounting to a customer's session upon recognition that it was directed to one of the IP addresses listed in the table.

These approaches to differentiated accounting do packet by packet or flow classification and then report the usage in number of packets consumed or KB (kilo-bytes) sent for that application or flow. These techniques enable service differentiation, however, such techniques do not provide any options for duration based billing. Many customers prefer duration based accounting because it is far easier to understand than accounting based on number of packets or bytes of data.

Duration based accounting raises other concerns. For example, some applications always need to maintain a data connection, but while idle, involve communication of relatively few packets. For example, for Push-to-talk (PTT), each station of an on-line member of a PTT group maintains (keeps alive) a data link to a PTT dispatch server. However, actual VoIP packets are transported through the network only when one member pushes the PTT button on his or her mobile station and transmits audio to the other group members. Once the PTT capable device sets up a session, it is either used exclusively for PTT purposes or used exclusively for non-PTT purposes. However, current prepaid processing schemes do not differentiate between these two uses, particularly in a manner that enables at least one application to be billed on a minutes of use basis. For an application like PTT, it would not be fair to charge by duration (minutes of use—MOU) for the entire time the user is logged-on for packet communication. However, when the same device is used for another application, for example web browsing, it may be appropriate to charge by duration of the packet data communication session.

Currently, it is not possible to distinguish, at the start of the data communication data session, whether the session has been setup by the mobile client device, for PTT use or for non-PTT use (e.g. BREW, mobile web). Hence a need exists for a technique to differentiate packet communications on a session level basis, for accounting purposes. For charging of a PTT subscriber, for example, the service provider needs to distinguish the PTT data session from the non-PTT data session and carry out the appropriate duration-based accounting for each type of session, e.g. to charge for duration of usage only on the non-PTT data sessions.

SUMMARY

The teachings herein provide a mechanism for classification of a data session, and a means to inform the server or the like that manages the prepaid treatment for data services of the session classification. Use of this mechanism facilitates charging differently, based on the classification of the data session.

Methods are disclosed for accounting for use of a packet data communication of a mobile station via a wireless communication network. An example of such a method includes receiving a request message relating to a request for the packet data communication service for the mobile station and identifying one of a number of available accounting policies that applies for communications of the mobile station. When the network establishes a packet data communication session for the mobile station, it begins measuring the duration of the session. The method also entails monitoring packet data communication for the mobile station via the established communication session, so as to detect an application type for the session, from among a plurality of application types under the identified accounting policy. The session is classified as one of the types defined under the identified accounting policy, based on the detected application type. The network can then perform an appropriate accounting operation in relation to the measured duration of the established session, as a function of the session classification.

This technique provides a means to charge over the duration of a data session, based on the classification of the data session. In the examples, a data session is classified by matching the destination or source of the data traffic to locally provisioned tables, which contain IP addresses. The classification of the data session is reported to the prepaid billing server, which can then charge and/or assign quotas based of the session classification.

This mechanism, for example, solves the problem of exempting the duration of a prepaid session if the prepaid data session is being used for a particular service while charging for the duration of a prepaid session if it is not being used for that particular service. In other words, the network can charge for the duration of a prepaid session differently, based on the service being used or application type using the transport, during the particular session. The entire duration of the session should be used exclusively by a particular service or application for correct charging to be applied.

One specific example differentiates between a data session for a Push-to-Talk (PTT) communication and any non-PTT data session. If the prepaid server is informed that the session has been classified as PTT, it does not charge the prepaid user for packet transport, as that type of service is billed by another mechanism. If the server learns that a data session is for non-PTT use, the server provides value-based prepaid treatment of prepaid user's traffic, typically based on duration of the non-PTT data transport session.

Instead of charging by KB on all packet communications, it is possible to charge by the total duration that a data session was maintained, for an appropriate session classification. Some sessions can use duration based accounting, e.g. MOU; whereas as other sessions can use packet or volume of traffic type accounting, e.g. KB. By putting a restriction on the device that the traffic of these two different kinds of application should not be mixed, the examples can classify the complete session as being chargeable based on duration or chargeable based on data traffic usage or free of charge for the transport layer service.

Also, the exemplary technique inspects only the initial packets, until a classification is made. As soon as the session level classification is made, packet inspection for classification purposes is stopped. Stated another way, it is not necessary to analyze and classify individual packets, for accounting purposes, throughout an ongoing packet data communication. However, at least some of the specific examples do limit communication to the type determined by the initial classification. Hence, it may be desirable that, once a session has been classified, the system performs packet inspection and discards packets that do not fit in with the initial session classification.

Another method, for example as might be implemented at a Packet Data Serving Node (PDSN) of the wireless communication network, provides a prepaid packet data communication service to the mobile station. In response to a message requesting packet data communication service for the mobile station, the node obtains an access acceptance from a server that maintains prepaid accounting information. The access acceptance identifies an available accounting policy, for application to prepaid communication service for the mobile station. This method also involves establishing a packet data communication session for the mobile station through the wireless communication network and measuring duration of the session. The node also monitors packet data communication for the mobile station via the established communication session, so as to classify the session as one of the various types possible under the identified accounting policy. The classification of the session is reported to the server; and upon termination of the session, the measured duration of the established session is reported to the server. This enables appropriate accounting in accord with the reported classification.

Another method, for example as might be implemented at a prepaid server (PPS), processes a prepaid packet data communication of a mobile station via a wireless communication network. This method involves receiving a request for access to a prepaid packet data communication service for the mobile station and identifying one of the available accounting policies that applies for prepaid communication service of the mobile station. The policy type identification may be provided to a node of the network that will establish a session for the requested prepaid packet data communication service for the mobile station. The method also entails receiving classification of the established session from the node. The classification corresponds to a detected one of the possible classifications defined under the identified accounting policy. Upon termination of the session, the server receives a measurement of duration of the session from the node; and the server can perform its accounting operation in relation to the measured duration of the session, as a function of the received session classification.

In addition to method implementations, the techniques summarized above may be implemented in hardware for use in one or more elements of the wireless communication network or in software for programming one or more such elements to implement the relevant methodology.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various networks, network equipment and communication processing techniques disclosed herein relate to session level classification of wireless packet data communications and differentiated accounting based on such session classification. The network implements a number of accounting policies, and selects one for application to service provided to a particular mobile station. At least one such policy supports or defines at least two different session classifications. A node handling routing of the session traffic monitors communications so as to classify the session, typically based on detection of a particular application to which the present session will relate. The selected policy then enables the network to apply the appropriate accounting to the session, based on its classification.

The present teachings may be implemented in a variety of network architectures that offer wireless packet data communication services. However, to insure a full understanding and appreciation of the present teachings, it may be helpful to consider an example of one such network architecture. Also, the present concepts are applicable to various known accounting practices, such as for postpay billing. However, for purposes of discussion, the examples will largely focus on applications to prepaid type services.

Figure 1:
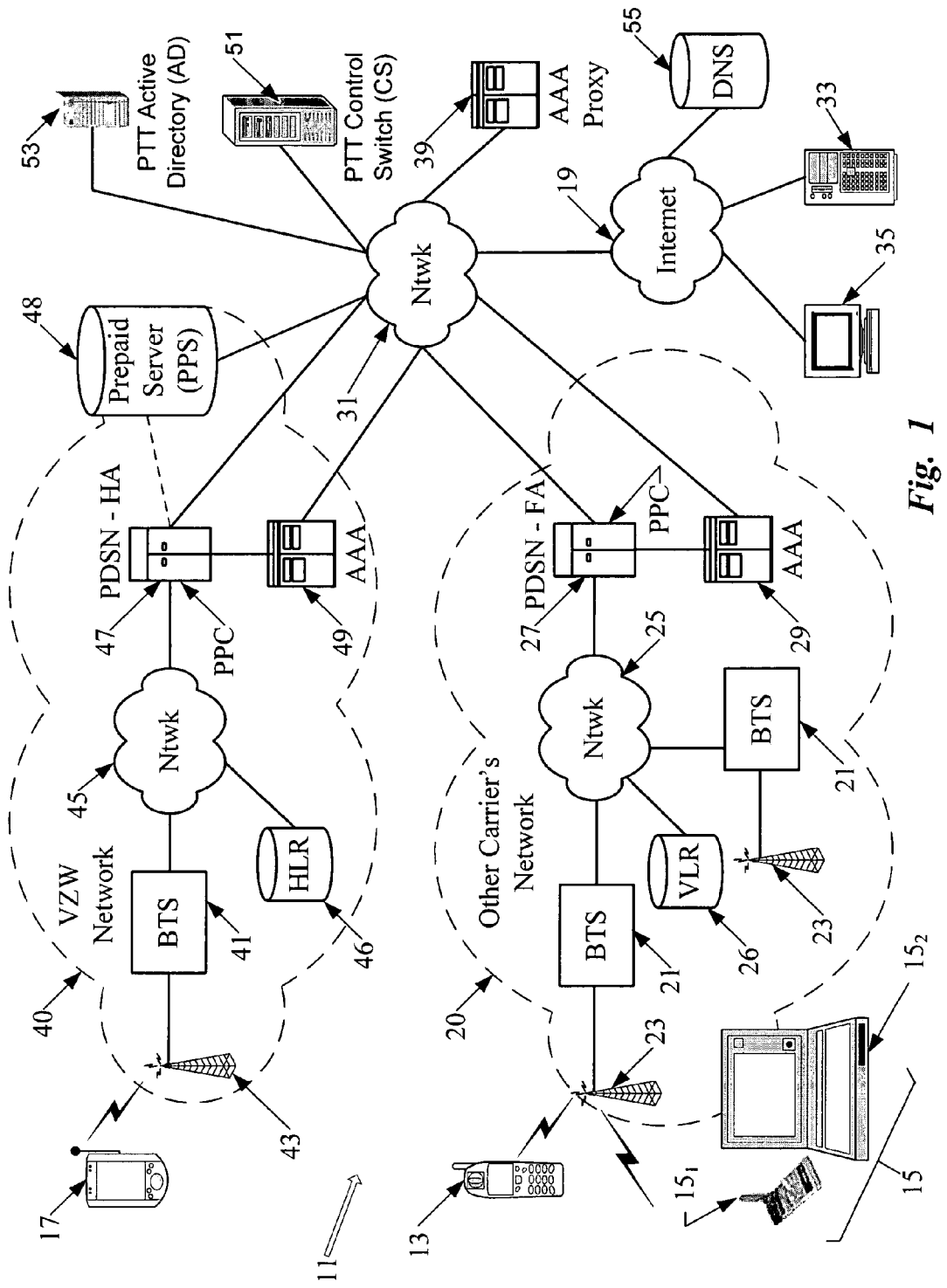
FIG. 1 is a simplified functional block diagram of mobile wireless communication networks offering various voice and data services, many of which may be offered on a prepaid basis.

FIG. 1 is a functional block diagram of an exemplary system 11 of wireless networks for providing mobile voice telephone services and high speed data services. The present concepts are applicable to a variety of different wireless technologies supporting packet data communications services, such as WiFi, WLAN, 1xRTT, GSM/GPRS, UMTS and EVDO. For purposes of discussion only, FIG. 1 represents an EVDO type network or a 1xRTT type system.

The communication networks implementing system 11 provide mobile voice telephone communications as well as packet data services, for numerous mobile stations. For purposes of later discussion three mobile stations 13, 15 and 17 appear in the drawing, to represent examples of several different types of the mobile stations that may receive different packet data services via the system 11. The station 13, for example, may take the form of a mobile telephone station, enhanced with display and user input capabilities to support certain text and image communications, such as email, picture communication and web browsing applications. Today, such mobile telephones typically take the form portable handsets, although they may be implemented in other form factors.

The station 15 is a portable computing device, specifically, comprising a wireless modem card 15$_1$ inserted into a handheld or laptop personal computer (PC) 15$_2$ or the like. Although shown as a separate card, the modem 15$_1$ may be integrated into the PC 15$_2$. Alternatively, the PC 15$_2$ may connect to a handset device, similar to the handset type mobile station 13. The station 17 takes the form of a personal digital assistant (PDA) or Blackberry type device incorporating a wireless transceiver compatible with the particular type of packet data service offered by the system 11. Of course, the mobile stations with packet data communication capabilities may take other forms or connect to a variety of other data devices that may enable use of the network communication services.

The system 11 may allow users of the mobile stations to initiate and receive telephone calls to each other as well as through the public switched telephone network (not shown). For purposes of this discussion, the system 11 enables any and all users of the mobile stations 13, 15 and 17 to initiate and receive various packet switched data communications, for example to or from the public data network 19 referred to as the Internet. Some of the users of the mobile stations will subscribe to voice and/or data services under one or more postpay service plans offered by a carrier or service provider. However, the users or subscribers of other stations will subscribe to voice and/or data services under a prepaid plan, in which they pay in advance for an amount of communication service usage. In the examples, usage is measured by duration, e.g. length of time of a circuit switched voice call or length of time of a data communication session.

The packet data services through the system 11 may allow communications with other networks such as private intranets (not shown). The packet data communications allow users of the mobile stations to send to or receive data from other digital devices that otherwise have access to the Internet 19, such as servers 33, hosts and personal computers 35 coupled to the Internet 19, as well as to or from other mobile stations.

The system 11 provides the various wireless communication services in accord with at least one digital radio protocol although for voice telephone services, the network may also support one or more legacy analog or digital protocols. The illustrated system 11 supports a variety of multimedia voice and data services, using digital packet communications over the air link. In an EVDO implementation, supported services include Voice over IP (VoIP) type telephone communications, as well as high-speed web browsing, just to name two exemplary services. In a 1xRTT implementation, the system would carry voice communications as separate circuit switched communications, although those communications also typically utilize a digital communication protocol.

The system 11 may comprise access networks operated by a large number of separate and independent service providers or "carriers." For discussion purposes, the drawing shows two such radio access networks (RANs) 40 and 20, which we will assume are operated by two different carriers (VZW and another carrier), although those skilled in the art will recognize that large carriers operate a number of such networks and that many countries have more than two mobile carriers that offer or soon will offer packet data communication services. Through the carriers' access networks 20 and 40, the overall system 11 offers mobile communications to customers using mobile stations throughout a wide geographic area.

Physical elements of a radio access network (RAN) 20, operated by one of the other carriers, include a number of base stations represented in the example by the base transceiver systems (BTS) 21, each of which communicates via an antennae system at the site of base station 23 and the air-link with one or more of the mobile stations 13, 15 and 17, when the mobile stations are within range. Each base station typically includes a BTS 21 coupled to several antennae mounted on a radio tower within a coverage area often referred to as a "cell." The BTS 21 is the part of the radio network that sends and receives RF signals to/from the mobile stations that the base station currently serves.

The network 20 also includes a traffic network 25, which carries the user communications for the mobile stations 13, 15 and 17. In a 1xRTT implementation, the network 25 includes a number of radio access network switches, typically modern versions of mobile switching centers (MSCs) or Mobile Telephone Switching Offices (MTSOs), which support both cellular voice and packet data services. Each such switch connects through trunk circuits (not shown) to a number of the BTS base station transceivers 21, which the respective switch serves and controls. In an EVDO (evolution data only) implementation, the network 25 is a high-speed packet switched data network comprising a number of packet switches/routers connected to the BTS base station transceivers 21.

The BTS 21 at a base station assigns and reassigns channels to the mobile stations 13, 15 and 17 that it serves and monitors the signal levels to recommend hand-offs to other base stations. The network 25 typically includes a base station controller (BSC) functionality that controls the functions of a number of base stations and helps to manage how calls made by each mobile station are transferred (or "handed-off") from one serving base station to another. Each wireless network equipment vendor implements this function differently. Some vendors have a physical entity, which they call a BSC, while other vendors include this functionality as part of their switch (not shown).

The network 20 also includes a number of Packet Data Serving Nodes or "PDSNs" 27 coupled to the traffic network 25. The PDSN is a fixed network element introduced in the architectures for 3g wireless networks, to support packet-switched data services. Each PDSN 27 establishes, maintains and terminates logical links to the associated portion of the radio access network 20. The PDSNs also support point-to-point (PPP) sessions with the mobile stations. The PDSNs provide the packet routing function from the radio network to/from other packet switched networks, represented generally by the private network 31 of the carriers and the Internet 19, in the drawing.

The PDSN 27 initiates Authentication, Authorization and Accounting (AAA) communications to an AAA server 29, for example, via a secure private packet network (not separately shown), for each mobile station client seeking packet communications. The server 29 provides Authentication, Authorization, and Accounting (AAA) functions for packet data calls in a cdma2000-1x (1xRTT) type network or an EVDO type network, such as the network 20. Such servers authorize service subscriptions, service profiles, and customized services. The AAA server 29 also performs a variety of accounting functions, including starting an accounting record, maintaining an interim accounting record, and stopping an accounting record, for each packet data communication service session in response to various messages from the PDSN(s) processing the data session. The PDSN 27 receives service parameters for the mobile station, operating as a mobile client, from the AAA server 29. The PDSN 27 also collects usage data for accounting purposes, which it relays to the AAA server 29. As will be discussed more later, the PDSN 27 also acts as a prepaid client (PPC) on behalf of the mobile station of a prepaid customer.

In a 1xRTT network implementation, the network 25 utilizes switched digital links through MSC or MTSO types switches, and the network 31 is a separate packet switched data network formed of packet routers/switches and appropriate interconnected packet links. In an EVDO implementation, the network 25 is a packet network, and the link or network to the AAA server 29 may utilize the same routers/switches and links to carry the various packet communications.

Although different radio access networks may utilize different technologies or architectures, for discussion purposes it is assumed that the RAN 40 is generally similar to the RAN 20. Like the network 20, the physical elements of the radio access network (RAN) 40, include a number of base stations represented in the example by the base transceiver system (BTS) 41. Each BTS 41 communicates via an antennae system at the site of base station 43 and the air-link with one or more of the mobile stations, 15 and 17, when the mobile stations are within range. The network 40 also includes a traffic network 45, which carries the user communications for the mobile stations 13, 15 and 17. As in the network 20, the traffic network 45 may utilize modern versions of mobile switching centers (MSCs) or Mobile Telephone Switching Offices (MTSOs), which support both cellular voice and packet data services; or the network 45 may utilize a number of packet switches/routers to provide a high-speed packet switched data network.

The network 40 also includes a number of Packet Data Serving Nodes or "PDSNs" 47 coupled to the traffic network 45. The PDSN 47 performs functions similar to those of the PDSN 27 in the network 20, both to provide packet switched routing services and to perform the validation and billing related functions. The network 40 also includes an Authentication Authorization and Accounting (AAA) server 49, analogous to the server 29. Again, the PDSN also acts as a prepaid client (PPC) on behalf of the mobile station of a prepaid customer.

The illustrated system 11 supports a range of packet data services. The packet data communications can support traditional data applications, such as browsing the Internet 19 and email communications to/from remote computers, represented generally by the server 33 and/or the personal computer (PC) or other workstation device 35. The packet data communications through the network 11 also can support Voice over IP (VoIP) type packet applications.

Different packet data communication sessions will be classified differently, in the example, for purposes of prepaid service accounting. In the exemplary prepaid service discussed below, sessions for the traditional data applications will receive duration based treatment, e.g. based on minutes of use (MOU) for on-line time. However, sessions for one or more other applications, such as push-to-talk (PTT) in the example, receive a different treatment, e.g. free for transport layer service or charged based on number of packets. To that end, the network implements a number of accounting policies. One prepaid policy applies to mobile stations of customers that also subscribe to the PTT service, and that policy enables classification of sessions as PTT or non-PTT. Of course, the network would effectively apply a different policy to communications of stations for which the customers do not subscribe to the PTT service or subscribe to one or more services requiring different classifications.

The classification examples focus on a prepaid service for customers that also subscribe to the PTT service. To fully appreciate the session classification and differentiated accounting for those examples, it may be helpful to discuss network elements involved in communications relating to the exemplary PTT application.

In general, VoIP communications entail digitizing and compressing audio information (typically audible speech information), and dividing the resultant data stream into portions that are encapsulated into IP packets, using an appropriate higher level protocol such as transmission control protocol (TCP). Packet switching nodes, such as the PDSN 27 47 and the packet switches of the networks 19 and 31, route the packets to the addressed destination. A computer or other processing device at the destination reconstructs the digital stream from the packets decompresses the data and converts the results back to an audible output signal for presentation to the recipient end user. The VoIP applications, for example, may provide communications between a handset 3 and a landline computer 35 via the Internet 19. One VoIP application of particular note in the commercial wireless industry provides a Push-to-Talk (PTT) type service for mobile handset users.

A conventional push-to-talk (PTT) communication utilizes several radio transceiver stations, all tuned to the same channel. When not transmitting, the transceivers receive any signal carried over the channel and supply any received audio to the users. A user wishing to speak pushes a button, which causes that user's transceiver to transmit audio over the common channel to the other transceiver(s) that share the channel. A Voice over IP (VoIP) implementation of a PTT service application utilizes separate packet links for the user devices and a dispatch application on a server. The sender station uses its link through the wireless packet data service to upload the sender's audio information to a PTT server. The station of one or more participants in the PTT communication obtains the data from the server via its packet service link; and each receiving station converts the data back to digitized voice. The other station on the PTT session may be a similar mobile station or a data device of various other types communicating with the server via the wireline packet data network.

A voice over IP (VoIP) implementation of a PTT service application utilizes wireless packet data service in combination with a wireline data network, such as the Internet or an intranet or extranet. Each member of a communicating group has a packet-switched session linking the member to a dispatch server, although the link may be dormant or inactive when not in use while the user is still logged on for data service through the network.

The dispatch server effectively distributes packets received from the member who has the floor (is speaking) to the one or more other parties participating in the PTT call. For example, if the station 13 is transmitting, a second station on the PTT session may be a similar mobile station or a data device of various other types (e.g. PC 15 or 35). In the illustrated example, the packet data communications for the mobile stations extend through the PDSN 27 or 47 and the carriers' internal packet network (private intranet) 31.

With the mobile PTT service, a mobile station such as 13 is designated as the broadcaster, in response to the Push-to-Talk signal. The Push-to-talk signal from the sender may be generated by actuation of an actual Push-to-Talk button on the particular mobile station, but often the signal is a logical control function, for example, generated in response to speech detection. A signal requesting the "floor" to speak is sent to the server. If granted to the new sender, the server also signals the other participant's client device to join (receive) the transmission and signals to the sender's station to begin transmitting VoIP data. The signaling between the stations and the server, for registrations and for call set-up for actually transmissions, typically utilize Session Initiation Protocol.

When the call is set-up, the broadcasting mobile station 13 digitizes the voice of the user, packetizes the digitized audio, and sends IP packets containing the audio to a base station 23 of the serving radio access network 20. The base station sends the data through the PDSN 27 and the data network 31, for forwarding thereof to a PTT server, represented by the "PTT Control Switch (CS)" server 51 in FIG. 1. The PTT Control Switch (CS) 51 replicates packets and adds destination addresses, as necessary, to send the VoIP packets to one or more of the other stations such as 15 and 17 (and/or to wireline connected terminal device 35) that are currently participating in the particular PTT session. Each client device of the other group member(s) receives and processes packets from the PTT Control Switch (CS) 51 to convert the data back to voice for output.

The PTT Control Switch (CS) 51 also dynamically controls which participant station "has the floor" to broadcast, and thus which station or stations will receive broadcasts at any given time. The server 51 can dynamically designate any participating station as the broadcaster and can dynamically configure any station or set of stations as the receiver(s) of the PTT broadcast.

For purposes of initially establishing a PTT session, the service provider may also operate a PTT Active Directory (AD) server 53. The server 53 maintains a database of parties or groups available for PTT communication, much like the buddy lists for instant messaging.

When members' stations come on-line, the stations register as active with the PTT Active Directory server 53. For the active stations, the server 53 also maintains dynamic information regarding each station's current location, e.g. including current network address information. When a user operates a client device such as handset 13 to register for PTT communication, the station signals the PTT Control Switch (CS) 51, and the switch 51 accesses the PTT Active Directory server 53 to determine which of the other group participant devices (e.g. "buddies") are on-line, and to obtain the information needed to contact each of the one or more other client devices. The server 51 communicates data regarding the on-line client devices to the handset 13. When the user of a client device, such as the handset 13, initiates a PTT communication, the sending client device and the PTT Control Switch (CS) 51 use the information from the Active Directory (AD) server 53 to invite the other client device to participate in the PTT session.

To facilitate packet switched data services, many communications rely on conversion of a high level domain name to an Internet Protocol (IP) address. Essentially, a client device sends a query containing a textual domain name to a server, and the server provides the appropriate IP address. The client device can then use the IP address to communicate with the appropriate destination equipment. For example, for packet data services, a handset such as 13 can request a domain name translation from a Domain Naming System (DNS) server 55 accessible via the Internet 19. The DNS server 55 provides the translation from the domain or host name supplied by a caller (e.g. one of the handsets) into a complete IP address. Since each site maintains its own domain name server, no single site on the Internet is in possession of all of the translation data. The overall data constitutes a distributed database and relies on the servers at the individual sites. Access to the DNS is through a resolver and software library functions.

Of note for purposes of this discussion, a DNS lookup is used to access an appropriate PTT Control Switch (CS) server 51, offering the PTT service. Such a function in this case takes a domain name or host name for the PTT service and returns an IP address, for communications with the appropriate server. Although a single server 51 is shown for convenience, the service provider will often operate a number of such serves. In such a example, a handset will use two domain names to obtain IP addresses for a primary Control Switch server and a secondary Control Switch server, from among the servers operated by the PTT service provider.

As will be discussed later, destination addresses can be monitored to classify sessions. The communications with the DNS are general and do not correspond to a particular application. Hence, addresses for the DNS server may not be classifiable. However, after DNS translation, the mobile station that intends to use a session for a PTT application will send packets addressed to the primary or secondary control switch. Further communications via the session will all relate (and may be limited) to the PTT application. Hence, the session can be classified as a PTT session upon initial detection of a packet addressed to either the primary or the secondary PTT control switch.

Different customers subscribe to service through different providers and are assigned to specific radio access networks (RAN's) 20 or 40 as their home networks; and the mobile stations and network elements are provisioned accordingly. Those skilled in the art will understand that the system 11 will provide services for many customers through their mobile stations, although for simplicity, only three mobile stations are illustrated. For discussion purposes, assume that mobile stations 13 and 17 belong to customers of the access provider network 40. For discussion purposes only, the home carrier is referred to as carrier "VZW," therefore the network 40 is the VZW network. The subscribers owning stations 13 and 17 are VZW customers, whereas the subscriber owning station 15 is a customer of the other carrier. Hence, stations 13 and 17 are 'homed' on the network 40. Similarly, the mobile station 15 is homed on the network 20 of the other carrier.

As shown, mobile station 17 is operating within the service area of its home access provider network 40. By contrast, the VZW customer using the mobile 13 has roamed out of the service area of its home access provider network 40 and into a different geographic area, where the mobile station 13 is receiving wireless service from a different access provider network referred to as the "visited" access provider network, in this case, a network 20 operated by the other carrier.

For voice communication services, some implementations (e.g. for 1xRTT) of the wireless network 40 include a Home Location Register (HLR) 46, which stores data regarding the valid station's identification, the assigned telephone number, subscription service options terminal capabilities, etc. The home network 40 uses the service information from the HLR 46 to provide the subscribed services to each user's mobile station, for example, while the station 17 is operating in the service area of the home network. Although the HLR 46 may reside in an MSC or other switch, today, the HLR typically runs as an application/database on a separate computer coupled for packet signaling communication via the SS7 network (not shown). In some networks, the computer or server providing the HLR functionality is referred to as a Service Control Point (SCP). Of course, there may be multiple computers distributed throughout the network for performing the HLR function. In some implementations, the SCP functionality is incorporated into an MSC or into a switch or router of the packet network providing the SS7 signaling communications. Other implementations provide packet communications to and from the element serving as the HLR via IP networking.

As a customer roams, the mobile station 13 registers in service areas other than the home area. To facilitate roaming and attendant registration for voice services, each network also implements a Visitor Location Register (VLR), such as the VLR 26 shown in the roaming other carrier's network 20. VLRs typically reside in the MSCs although the function may be implemented in other network nodes. The VLR 26 and the HLR 46 interact to validate the roaming mobile station 13. For a validated station 13, service information for that station is downloaded from the HLR 46 to the VLR 26 in a visited access network 20 during a successful registration process. The validation process also provides information to the HLR 46 indicating the current location of the station 13, in this case, within the network 20, to allow the home network 40 to route incoming voice calls to the station 13 at its current location.

The AAA servers interact to provide similar validation and location update functions, for packet data communication services. Authentication, Authorization, and Accounting (AAA) servers 29 and 49 are used for Authentication, Authorization and Accounting functions for packet data calls in a 1xRTT or EVDO type system 11. Both access networks 20 and 40 include one or more such servers 29 and 49; and there may be one or more third party trusted AAA servers 39 that serve as proxies for communications between AAA servers of different carriers. As noted, the AAA servers provide authentication for roaming mobile stations that request packet data communications services, such as the station 13. The home server 49 also maintains data derived from the validation process, which provides an up to date indication of the point of attachment of the roaming station 13 to a wireless network, such as to the visited network 20.

In the preferred implementation of the system 11, all authentication, authorization and accounting transactions are performed using the RADIUS (Remote Authentication Dial-User Service) protocol. RADIUS protocol has been in use for many years and is used widely in the ISP (Internet Service Provider) networks. In the network 20, RADIUS is implemented on a client-server model in which the PDSN 27 acts as the client and AAA 29 acts as the server. Similarly, in the network 40, RADIUS is implemented on a client-server model in which the PDSN 47 acts as the client and AAA 49 acts as the server.

During registration of roaming subscribers, it becomes necessary to conduct certain transactions between AAA servers 29 and 49. These communications may be conducted directly via the IP network 31 or the like. In many cases, however, the AAA server 29 or 49 in each respective network 20 or 40 will communicate via the IP network 31 with a secure broker server 39 acting as an AAA proxy server. The IP network 31 could be a public network, such as a portion of the public Internet. However, because of the mission-critical nature of the AAA communications and the security and finance-related issues involved in such communications, the IP network 31 preferably is a secure packet communication network operated by one or more of the carriers or their trusted service providers.

In a typical data session with normal postpay type accounting, the AAA functionality also provides user authentication, usually in the form of a challenge and response procedure to obtain and validate a user ID and password. In the visited network 20, the AAA server 29 communicates with the AAA server 49 in the home network (possibly via proxy 39) to validate user ID and password information received from the user of the roaming station 13. Often, the data session may be considered to "start" when the user log-in is successfully completed. The data session "ends" when the user logs off or the session is terminated, e.g. due to interruption of packet communications to/from the mobile station 13. As discussed in more detail, later, the AAA servers also proxy messaging related to authentication and registration with respect to a platform 48 that administers or manages accounts for prepaid customers.

The network 1 may provide Simple IP (SIP) address assignment, Mobile IP (MIP) address assignment, or both. The monitoring and session classification are implemented in the node that assigns the IP address to the mobile station for the particular data communication session. As such, the location of this classification and accounting related functionality may vary depending upon the type of address assignment service. Hence, some further discussion of SIP address assignment and MIP address assignment may be helpful.

Figure 2:
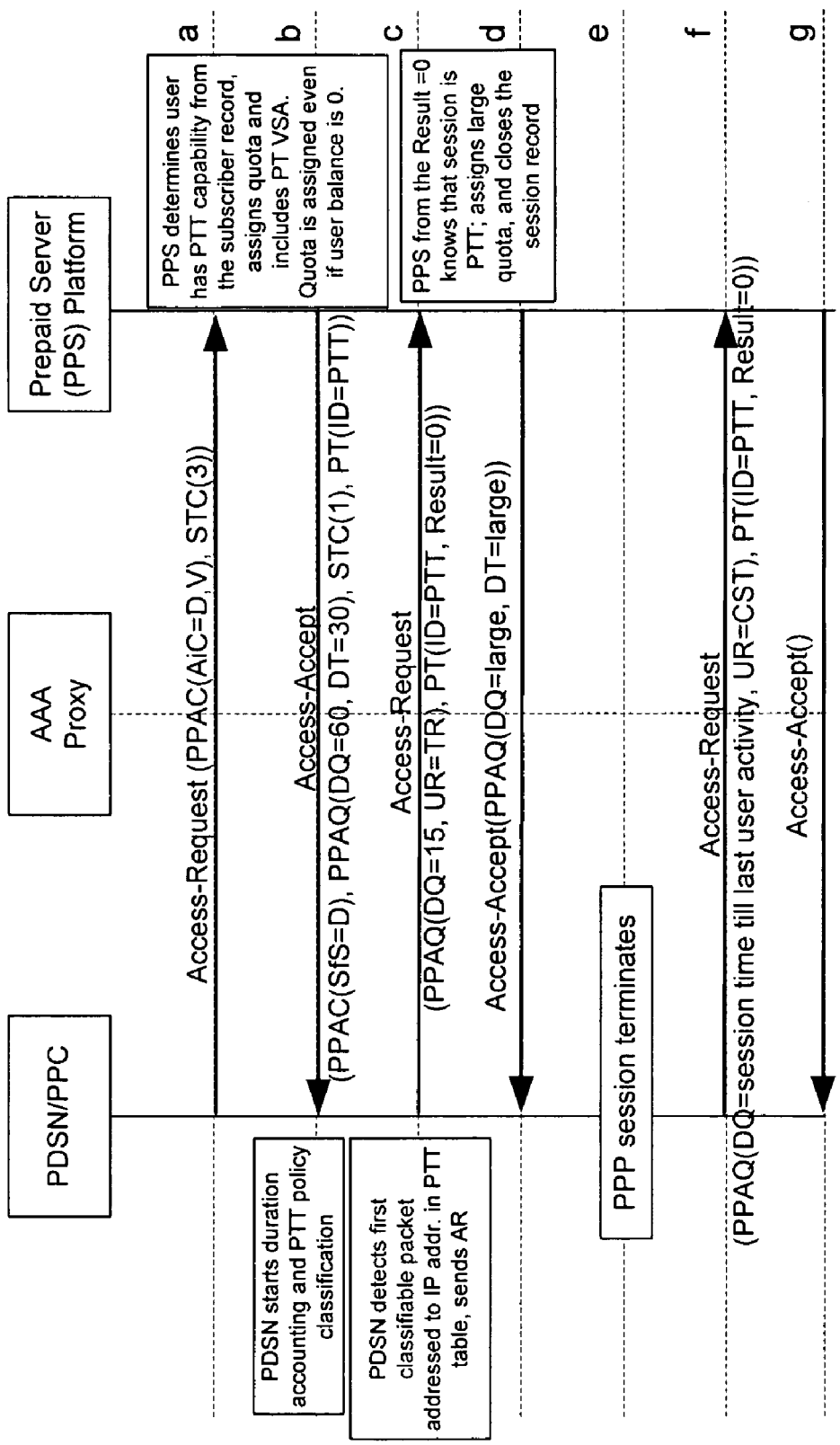
FIGS. 2 to 6 are signal flow diagrams useful in explaining various processing operations involved in providing the prepaid data service via the network of FIG. 1, with duration based accounting facilitated by session classification.

SIP is a service in which the user is assigned a dynamic IP address from the current serving PDSN. In the example of FIG. 2, the station 17 would receive an IP address assignment from the PDSN 47, whereas the stations 13 and 15 would receive IP address assignments from the PDSN 27. A service provider network provides the user's mobile station with IP routing service. The user's mobile station retains its assigned IP address as long as that station is served by a radio network 20 or 40, which has connectivity to the PDSN that assigned the IP address to the particular mobile station. However, there is no IP address mobility beyond the service area of this PDSN, and as a result, there is no handoff between PDSNs such as 27 and 47. With the SIP type address assignment service, the serving PDSN acts as the prepaid client (PPC), and the monitoring and session classification are implemented in the serving PDSN/PPC node. PTT service currently uses SIP type address assignment.

MIP is a service in which the subscriber is assigned an IP address from a "home" network. With the MIP service, the assigned IP address does not change as the mobile station changes it's point of attachment to the network (e.g. by roaming across a PDSN service boundary). If MIP assigned, the IP address remains assigned to the particular mobile station until that station logs-off, is inactive for longer than some set period, or the data session is otherwise terminated.

MIP address service enables routing of packets between PDSNs 27 and 47, to effectively enable roaming between service areas of different PDSNs. At log-in, the home agent (HA) in the network 40 assigns an address to the station, from the VZW home carrier's pool of addresses, for use during the duration of the session. When a mobile station has roamed across a PDSN boundary, for example when station 13 roams from network 40 to network 20, the mobile station will obtain packet data services via the PDSN 27. As it roams across the boundary, the mobile station must obtain a "care-of-address" (COA) from a local Foreign Agent (FA), and the registration/ validation process provides notice of this COA to the station's Home Agent (HA) on the home network 40. Although other control nodes or routers may perform these Agent functions, in the illustrative embodiment, the PDSNs 27 and 47 serve as these Agents.

The COA address allows the PDSN-HA 47 to route incoming packets for the station 13 arriving with the assigned mobile address through the PDSN-FA router 27 and the visited network 20, and hence, to the roaming mobile station 13. Outgoing packet traffic from the mobile station 13 is typically addressed as normal and routed directly from the PDSN 27 to the destination "correspondent node" (CN), from the visited or "foreign" network 20. This combination of routing paths (MS→FA→CN, and CN→HA→FA→MS) is referred to as "triangular routing." An option is for a "reverse tunnel" to be established between the FA and the HA, so that all outgoing traffic from the mobile station 13 appears to originate on its home network 40. During these communications, the PDSN 27, acting as a Foreign Agent (FA) router, forwards various status and usage data to the associated AAA server 29.

With the MIP address assignment type service, the serving home agent (HA) 47 acts as the prepaid client (PPC), and the monitoring and session classification are implemented in the HA node.

The AAA servers perform a variety of accounting functions, including starting an accounting record maintaining an interim accounting record, and stopping an accounting record for a packet data communication service. For example, based on data from the PDSN 27 and/or the user login and session termination times, the AAA server 29 provides one or more usage reports regarding each data communication session of the roaming mobile station 13 conducted through the other carrier's network 20. The reports for all sessions of all stations 13 homed to the network 40 may go through the network 31 to the AAA server 49 or directly to the VZW carrier's billing system or other processing system.

A carrier, such as VZW, that offers a prepaid service will also operate a prepaid server (PPS) 48, which manages customers' prepaid accounts. An example of a suitable platform for the PPS 48 is the SurePay® from Lucent Technologies, although other similar platforms may be used or generic platforms may be programmed to operate as the PPS 48. For voice telephone calls, the PPS 48 interacts with switches of the networks 25, 45 and/or with nodes providing HLR/VLR functions to provide prepaid accounting and management of the calls, in a manner well known in the art. In advanced systems such as that shown in FIG. 1, the PPS provides a unified prepaid service control for voice calls and for all other types of services offered through the system 11, such as short message service (SMS). For purposes of the present discussion, the PPS platform 48 also manages prepaid functions relating to packet data services.

In the illustrated example, servers such as 29, 39, 48, 49 and 51-53 are intended to represent a general class of data processing device commonly used to run "server" programming. Each such device typically runs a general server type program and one or more application programs on top of the server programming, to implement the respective functionality. Such a device typically utilizes general purpose computer hardware to perform its respective server processing and to perform the attendant communications via the network(s). Each such server for example includes a data communication interface for packet data communication. The server also includes a central processing unit (CPU), in the form of one or more processors, for executing program instructions. The server platform also includes program storage and data storage for various data files to be processed and/or communicated by the server. The hardware elements operating systems and programming languages of such servers are conventional in nature, and it is presumed that those skilled in the art are adequately familiar therewith.

In accord with the present discussion, the processing of prepaid packet data communications involves an initial session classification and use of the classification to determine a billing treatment for all packet communications during the session. An accounting policy is selected for the mobile station. Then, packet communications for the mobile station are monitored to detect a feature (e.g. application type) enabling selection of one of the classifications that are possible under the particular policy.

Those skilled in the art will recognize that the system may support any number of different classifications and attendant differentiated prepaid accounting treatments, and that the classification may be related to a variety of different types of packet data communication applications or services. For purposes of an example, consider a technique differentiating between two classifications, in which one classification relates to a session for the PTT service and the second classification relates to all other packet data communication applications (e.g. collectively including web browsing, e-mail, downloading, etc.). Hence, the procedures for prepaid data services in the system 11 are adapted to identify and apply a policy for a subscriber having PTT service and then differentiate between a data session being used for Push-to-Talk (PTT) and a data session being used for any other application except PTT.

In the example, the prepaid accounting does impose a restriction on the data communication services of the prepaid users. Each session must be limited to a single application type, that is to say PTT or non-PTT in our example. The mobile station and the network will close a classified session for one application, when that application ends, and will open a new session for the other type of application when the user shifts application types. Duration based billing therefore can be readily applied to at least one type of session, that is to say to bill for or reduce a prepaid account based on the duration of the particular type of session.

Although it is not necessary to monitor all packets for classification purposes, once a session is classified, it may be desirable to inspect packets and discard any that relate to a different application or classification. The element that does the classification of the data session by checking IP destination addresses against tables and classifying sessions, would also perform this 'filtering' function. Packet filtering could be implemented in a manner similar to any of a variety of known filtering techniques, except that here the filtering is tied to the session classification and local policy.

The differentiated accounting could dictate a packet counting measurement for application to sessions of one classification and apply duration based accounting for the other class of sessions. Another approach might charge a one-time flat fee for each session of one type, and apply a usage based accounting (e.g. time or number of packets) to sessions under the other classification. In the example discussed below, if the Prepaid Server (PPS) 48 is informed that the session has been classified as PTT, it does not charge the prepaid user for specific usage (e.g. by minutes or number of packets) for the packet transport service. For non-PTT use, the prepaid user is charged based on on-line time, e.g. based on duration measured in minutes of use (MOU). It should be noted that the PTT session is not necessarily completely free in the example. The network transport piece (session duration) is free from the perspective of the PDSN routing functions. However, charges for the application level PTT service may be applied on a post pay or prepaid basis via a mechanism implemented by the PTT server(s), which is beyond the scope of this discussion.

The prepaid data (PPD) service allows the subscriber to pay for packet data service prior to usage, particularly for the transport layer part of the service provided by the networks 20 and 40. The integration of PPD with the prepaid platform for other services offered by the carrier (VZW) of network 40 provides a more universal prepaid service package that allows dynamic use of prepaid balance for any type of service (voice, packet data, SMS, etc.) regardless of serving network (3G, 802.11, etc.).

When a subscriber establishes an account with the carrier for packet data service, appropriate provisioning is made at the VZW AAA server 49 and in the prepaid server platform 48 to allow the subscriber to receive PPD service. The AAA server 49 acts as a proxy for the prepaid user's RADIUS messages, except accounting messages. The AAA server 49 proxies the RADIUS messages to the provisioned prepaid server platform 48. The AAA server adds relevant information (e.g. MIP attributes) to the received RADIUS messages from prepaid server 48. The serving FA PDSN 27 and the HA 47 act as TIA-835-C prepaid clients (PPSs). The VZW prepaid platform 48 acts as the TIA-835-C prepaid server (PPS).

When the subscriber initiates a PPD call, one of the AAA servers proxies the RADIUS Access-Request to prepaid server 48. The prepaid server 48 checks the subscriber's balance and PDSN/HA prepaid and session termination capabilities, and the server 48 grants either the serving PDSN (for SIP sessions) or the HA (for MIP sessions) prepaid client (PPC) duties by providing a quota.

The assigned PPC carries out quota replenishment after threshold expiry using online Access-Requests, which contain the amount of duration/volume used for that session. The PPC will release resources when the quota is not replenished and runs out. When the subscriber ends the packet data session or the PPC is remotely (by prepaid server) instructed to tear down the PPP session, the assigned PPC reports the used duration/volume, via AAA, to the prepaid server 48.

In the example, the PDSNs support Mobile IP (MIP) addressing for dynamic and static address services. The wireless network also supports Simple IP (SIP) address administration. Push to Talk (PTT) is a Voice over IP (VoIP) application that uses the 1xRTT data transport. PTT currently uses SIP. Currently, it is not possible to distinguish, at the start of the PPP session, whether the session has been setup, by the PTT device, for PTT use or for non-PTT use (e.g. BREW downloading, mobile web). Once the PTT capable device sets up a PPP session it is either used exclusively for PTT purposes or used exclusively for non-PTT purposes. The PPP session is not shared by PTT and non-PTT applications. Hence, in the exemplary system 11, for prepaid charging of a PTT subscriber, the serving network 20 or 40 distinguishes the PTT data session from the non-PTT session and carries out duration based prepaid accounting for only the non-PTT data session. The network does not charge for packet transport for the PTT sessions. The PTT sessions are charged by the PTT Control Switch, although such charges may also be deducted from a customer's prepaid account through separate procedures.

In general the wireless communication network 11 offers a packet data communication service to a mobile station, such as the station 13. The network receives a request message relating to a request for the packet data communication service by the mobile station, and in response, a network element identifies one of a number of available accounting policies that applies for communications of the mobile station. The network establishes a packet data communication session for the mobile station and begins measurement of duration of the session. One of the network elements monitors packet data communications for the mobile station via the established communication session to detect an application type for the session from among two or more application types under the identified accounting policy. The session can then be classified under the identified accounting policy, based on the detected application type. The network performs accounting in relation to the measured duration of the established session, as a function of the session classification.

In the specific example of the network 11, offering prepaid packet transport services, when the mobile station 13 requests access to packet data service, the PDSN 27 sends an initial access request message which the AAA server(s) forward to the PPS server platform 48. The PPS 48 identifies the applicable policy type for the particular mobile station and includes the identified policy type in a field of the responsive (initial) access accept message. For prepaid service, the access accept message also specifies an initial quota. Additional exchanges of access-request and access-accept messages, while the mobile station is on-line, enable real time rating and management of the packet transport service.

The PDSN 27 completes establishment of the data communication session, e.g. the PPP session and the associated SIP session, and it begins duration measurement. The PDSN 27 also begins monitoring packets for session classification purposes. In the example, the PDSN compares addresses of packets sent from the mobile station 13 to one or more address tables used for classification purposes, as will be discussed in more detail later. Based on the address comparison, the PDSN 27 detects application type (PTT or non-PTT in our example) and classifies the session accordingly.

The PDSN 27 sends a new access request message (e.g. an online access request), which is forwarded to and received by the PPS 48 (similar to the procedure for asking for replenishment of the quota). The new access request message includes the identified policy type and a field indicating the result of the classification, e.g. 0 for PTT or 1 for non-PTT. If an access request message is sent before classification, e.g. for quota replenishment before classification, the result field can include a 2 indicating that the session is still unclassified.

In response to an online access request message including an actual classification result (PTT or non-PTT in the example), the PPS specifies an appropriate new quota. For a PTT session, the PPS 48 assigns a large quota and closes its accounting record for the session (because it will not charge for transport for PTT session). For a non-PTT session, the PPS 48 will assign a quota based on the normal prepaid algorithm and the subscriber's account balance, for duration based charging for packet data communications services.

The PDSN 27 monitors communications of the mobile station 13, for the duration of the session, including to measure that duration. From time to time, the PDSN may request replenishment of the quota. For a PTT session, the replenished quota will remain high regardless of account balance. For non-PTT sessions, the quota will always be that normally applicable to the prepaid packet service under the applicable charging algorithm. For example, if the account is exhausted, the PPS will respond with an access reject message, and the PDSN will terminate the session.

When the classified session ends, the PDSN 27 sends a final access request message. This message, however, indicates termination and provides the PPS 48 with the measured duration for the session. For a PTT session, the PPS takes no further action. Hence, the PDSN and PPS have not reduced the customer's account balance based on transport session duration. For a non-PTT session, the PPS 48 will adjust the account according to the duration of usage, typically by reducing the account balance appropriately based on the measured duration of the session.

In the example, the communications between the PDSN's and the PPS platform 48, which were proxied through one or more of the AAA servers, use TIA-835/3GPP2 standard RADIUS messages. A brief summary of aspects of the RADIUS protocol may be helpful.

The 3GPP accounting standard is 3rd Generation Partnership Project 2 (3 GPP2), cdma2000 Wireless IP Network Standard: Accounting Services and 3GPP2 RADIUS VSAs, 3GPP2 X.S0011-005-C, Version: 1.0.0, August 2003. The standard with regard to prepaid is 3rd Generation Partnership Project 2 (3 GPP2), cdma2000 Wireless IP Network Standard: PrePaid Packet Data Service, 3GPP2 X.S0011-006-C, Version: 1.0.0, August 2003. Under these standards, packet Accounting parameters are divided into radio specific parameters collected by the radio access network, and IP network specific parameters collected by the serving PDSN. The serving PDSN merges radio specific parameters contained in radio network interface messages called Airlink Records with IP network specific parameters, to form one or more Usage Data Records (UDRs). The serving PDSN uses RADIUS accounting messages to send UDR information to the visited AAA server. The visited AAA server maintains the UDR until the record is delivered to a home AAA server and/or to the prepaid service platform 48.

RADIUS accounting messages are generated from the information in the UDR. RADIUS messages, fields referred to as Attributes carry the relevant details, that is to say the information related to the authorization or accounting purpose of the respective messages. Of note for purposes of the present discussion, a Vendor Specific Attribute (VSA) referred to as "Policy Type" (PT) is added to the relevant RADIUS messages. The PT attribute is used, for example, to apply a specific policy to prepaid services of mobile stations, whose users subscribe to the push-to-talk service. As will be described later, a PDSN or HA will receive a policy type indicator corresponding to PTT, from the prepaid service platform 48; and in response, the PDSN or HA will apply the PTT policy, for example, to examine packets for the session until it can classify the session as a PTT session or a non-PTT session.

Exemplary aspects of an implementation of a prepaid service, in this manner, are discussed in more detail below.

As shown by the above discussion, one of the nodes involved in routing for the session for the prepaid mobile service customer needs to classify the session. As there is no means of distinguishing PTT and non-PTT session at session setup, the prepaid Client (PPC) needs to examine the packets being sent and received thereafter, to classify the session. The PTT application on the mobile station needs to communicate with PTT Control Switches and DNS servers. Therefore, a data session can be classified as PTT if there is any packet traffic for the mobile station going to or from PTT Control Switches.

The PPC will be provisioned with two local tables indexed as 'PTT' and 'UCA.' The 'PTT' table entries contain IP address ranges (IP address and IP mask) of PTT Control Switches. The 'UCA' table contains a list of IP addresses for the DNS servers and any other addresses, which are known to prevent classification of a session as PTT or non-PTT. The prepaid server (PPS) 48 will send the VZW PolicyType VSA in the Access-Accept message, with the identification for the Policy Type (PT) set to 'PTT' for data sessions that need to be classified as PTT and non-PTT using the PPC's local PTT policy. When the PTT policy is being used for a particular data session, the PPC will classify the data session as either undetermined, PTT, or non-PTT. The PPC will communicate the classification of the session using the Result subtype of the VZW PolicyType VSA in all the online Access-Requests.

The session will be classified as "undetermined" at the start of the data session and the PPC will perform the type of prepaid accounting (duration or volume) being requested by the PPS. As soon as a packet is determined to be going to an IP address that is NOT present in either the UCA table or the PTT table, the session is classified as non-PTT. Note, in the example, only the destination address of packets originated at the mobile station are checked to classify the session, to prevent unsolicited incoming traffic from triggering the change in classification. As soon as a packet is determined to be going to an IP address that is NOT present in the UCA table but present in the PTT table, the session is classified as PTT. As soon as there is a change in classification from 'undetermined' to 'PTT' or to 'non-PTT,' the PPC will send an online Access-Request to the PPS and stop examining packet origination and destination addresses for the purposes of classification.

Consider now the Local Policy Requirements that may be used to support the PTT Local Policy in an example of the prepaid service. In the example, the PDSN 27 or 47 providing address assignment and routing for the mobile station supports the VZW PolicyType VSA. The following are the local policy requirements to be followed for the 'PTT' Policy, i.e. when the PT Identifier Subtype in the VZW PolicyType VSA is set to 'PTT' (0):

a. The PDSN supports the ability of examining source and destination addresses of IP packets transported in a data session while carrying out duration or volume prepaid accounting for that session.

b. For data sessions that require the local policy to be applied, the PDSN classifies those data sessions as PTT or non-PTT as follows:

i. The classification of the session is set to 'undetermined' at the start of the session.

ii. When the destination IP address of a packet originated by the mobile device does not match the IP address of unclassifiable servers (present in a local table indexed as 'UCA') or the IP address of a PTT control switch (present in a local table indexed as 'PTT'), then the session is classified as 'non-PTT'.

iii. When the destination IP address of a packet originated by the mobile device does not match the IP address of unclassifiable servers present in a local table indexed as 'UCA', e.g. DNS servers, but matches with the IP address of a PTT control switch present in a local table indexed as 'PTT', then the session is classified as 'PTT'.
c. The following Result values are used for the Result subtype of the VZW PolicyType VSA to indicate the classification of the data session:
  i. Result value=0 for a session classified as 'PTT'
  ii. Result value=1 for a session classified as 'non-PTT'
  iii. Result value=2 for a session classified as 'undetermined'
d. The PDSN stops examining the IP packet addresses for PTT policy classification purposes as soon as the session is classified as 'PTT' or 'non-PTT.'
e. The local policy operates as required in spite of other prepaid features that may apply to the data session (for example, remote address accounting, tariff switching, etc.).
f. IP address examination for the means of PTT classification using the PTT local policy precedes IP address use for all other prepaid classification purposes, e.g. an IP address is examined for PTT classification purposes before it is examined for remote address accounting purposes.
g. No special action is specified for this local policy on receiving the PolicyOFF subtype in the VZW PolicyType VSA. If the PolicyOFF subtype is received for this policy, it should be ignored.

In the example, each PDSN platform that may serve as a PPC allows the provisioning of local tables. These tables are assigned indexes that can then be referred to in local policies. The entries in the local table identify an IP address or an IP address range (i.e. IP address and IP address mask). In an initial implementation, a local table contains a maximum of 32 address range entries. Two local tables are supported. One local table is indexed as 'PTT,' whereas the other local table is indexed as 'UCA.'

In the PDSN RADIUS Message processing, upon receiving an initial Access-Accept with the VZW PolicyType VSA containing the PT Identifier subtype set to "PTT" (0), the PDSN carries out the type of prepaid accounting as indicated in the Prepaid Accounting Capability (PPAC) field. The PDSN then starts examining IP packets for PTT classification purposes and behaves according to the local policy requirements for 'PTT' specified above.

When the 'PTT' local policy is in use for the prepaid session, the PDSN includes the VZW PolicyType VSA, with the PT identifier set to indicate the local policy in use ("PTT"), in all the online Access-Requests for that session. The VZW PolicyType VSA also contains either the Result subtype set to indicate the current classification of the data session or the Error subtype.

When the 'PTT' local policy is in use for the prepaid session, the serving PDSN sends an online Access-Request to the PPS and stops examining packet origination and destination addresses for the purposes of classification as soon as the classification changes from 'undetermined' to 'PTT' or 'non-PTT.' The online Access-Request contains the Prepaid Accounting Quota (PPAQ) field with Duration Quota (DQ) or Volume Quota (VQ) set to indicate the used duration/volume for the session, the UpdateReason subtype set to 'threshold reached,' the PT identifier subtype in the VZW PolicyType attribute set to the local policy in use ('PTT,') and Result subtype set to identify the current classification, i.e. PTT or non-PTT.

Consider now PPS quota assignment based on session classification. The minimum dollar amount, duration, volume or percentage of the subscriber's balance that needs to be always assigned in a quota provided that the balance can cover that quota assignment is configurable. The value of this setting is a fairly large value to try and minimize the number of quota requests during a data session. For example, if the minimum quota is set to 10 minutes and the user's balance can cover 20 minutes, then the quota assigned will be for 10 minutes. But, if the user's balance can cover only 5 minutes, then the quota assigned will be for 5 minutes. This policy is referred to as 'minimum quota policy.'

An Initial quota is assigned when a data session is established. In all cases PTT subscribers are assigned a quota, which is at least as large as the platform-configured 'low' quotas and thresholds. If the PTT subscriber's balance is zero, the quota assigned shall be equal to the low quotas and thresholds.

For a subsequent quota assignment, a Quota is requested and session identified as being classified as 'PTT.' The Quota and threshold sent is the platform-configured 'large values.' No other quota requests are expected for that session, since the PPP session has a life of 24 hours.

For a Quota requested and session identified as being classified as 'non-PTT,' a Quota is assigned from the balance based on the 'minimum quota policy.'

For a Quota requested and session identified as being classified as 'undetermined,' a Quota is assigned from the balance based on the 'minimum quota policy.' Dummy quotas are assigned when all of the subscriber's balance is reserved. The dummy quota and the dummy threshold are then set to '$T_{max}$-undetermined' or 'Vmax-undetermined.'

Consider now the Prepaid Server charging for a PTT customer. For a Session identified as being classified as 'PTT,' upon session close, the system does not charge for the duration or volume consumed. The account balance is not reduced or changed as a function of transport layer usage. For a session identified as being classified as 'non-PTT,' upon session close, however, the system charges for the duration or volume consumed. For a session classification that is 'undetermined,' upon session close, the system will credit the reserved quota back to the customer's account.

The drawings include a series of call or signal flow diagrams (FIGS. 2-6) illustrating the signaling between the PDSN serving the mobile station as the PPC for a prepaid packet data session and the prepaid server (PPS). Messages between the PDSN/PPC and the PPS are proxied through one or more of the AAA servers. The sequence of steps involved in these processes should be readily apparent from observation of these drawings, and only summary comments are provided below.

FIG. 2 is a call flow diagram for a prepaid packet data session, in which the PPC classifies the session as PTT before the charging reaches an initial threshold. The example shows duration based charging. Of note, the PPS identifies the PTT policy as applicable to the data call for the particular mobile station and informs the PPC (in the first Access-Accept message). The PT field includes an identifier corresponding to PTT. The PDSN/PPC monitors packets from the mobile station and compares destination addresses to addresses in the local PTT and UCA tables. In this example, the PDSN detects a PTT address and informs the PPS in the next Access-Request message. That message includes the PPT identifier as the Policy Type (PT), and it includes a result indicating the classification, in this case a Result=0 to indicate the classification of the session as a PTT session. Because of the PTT classification, the PPS closes the session record without reducing the prepaid account based on duration of the session.

Figure 3:
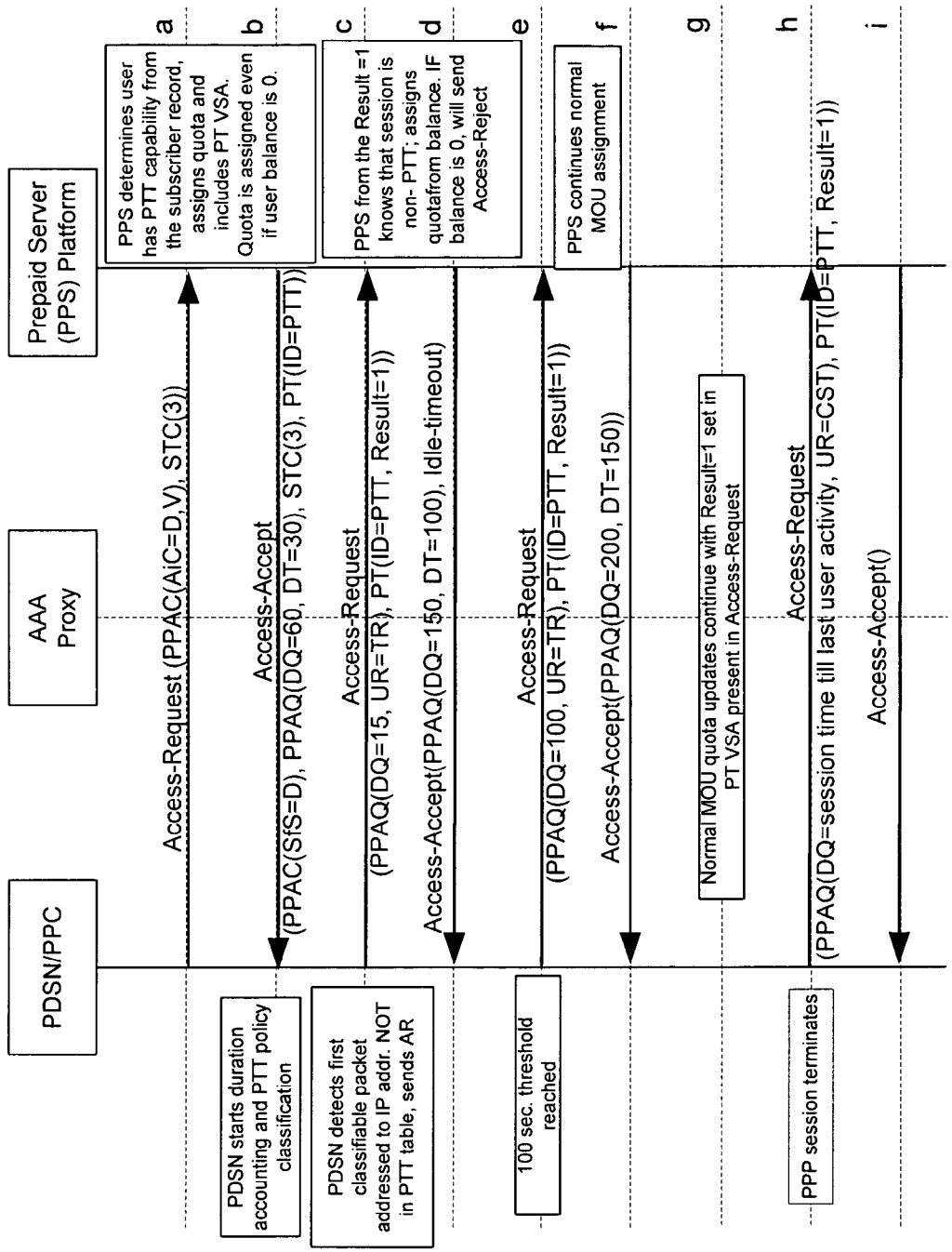

FIG. 3 is a call flow diagram for a prepaid packet data session, in which the PPC classifies the session as non-PTT before the charging reaches an initial threshold. Again, charging is based on duration. Processing is generally similar to that in the preceding example, except that because of the non-PTT classification, the PPS interacts with the PPC to perform quota replenishment and reduces the account balance based on the duration of usage, after indicating non-PTT classification (PT=PTT; and Result=1) in the second access request message.

Figure 4:
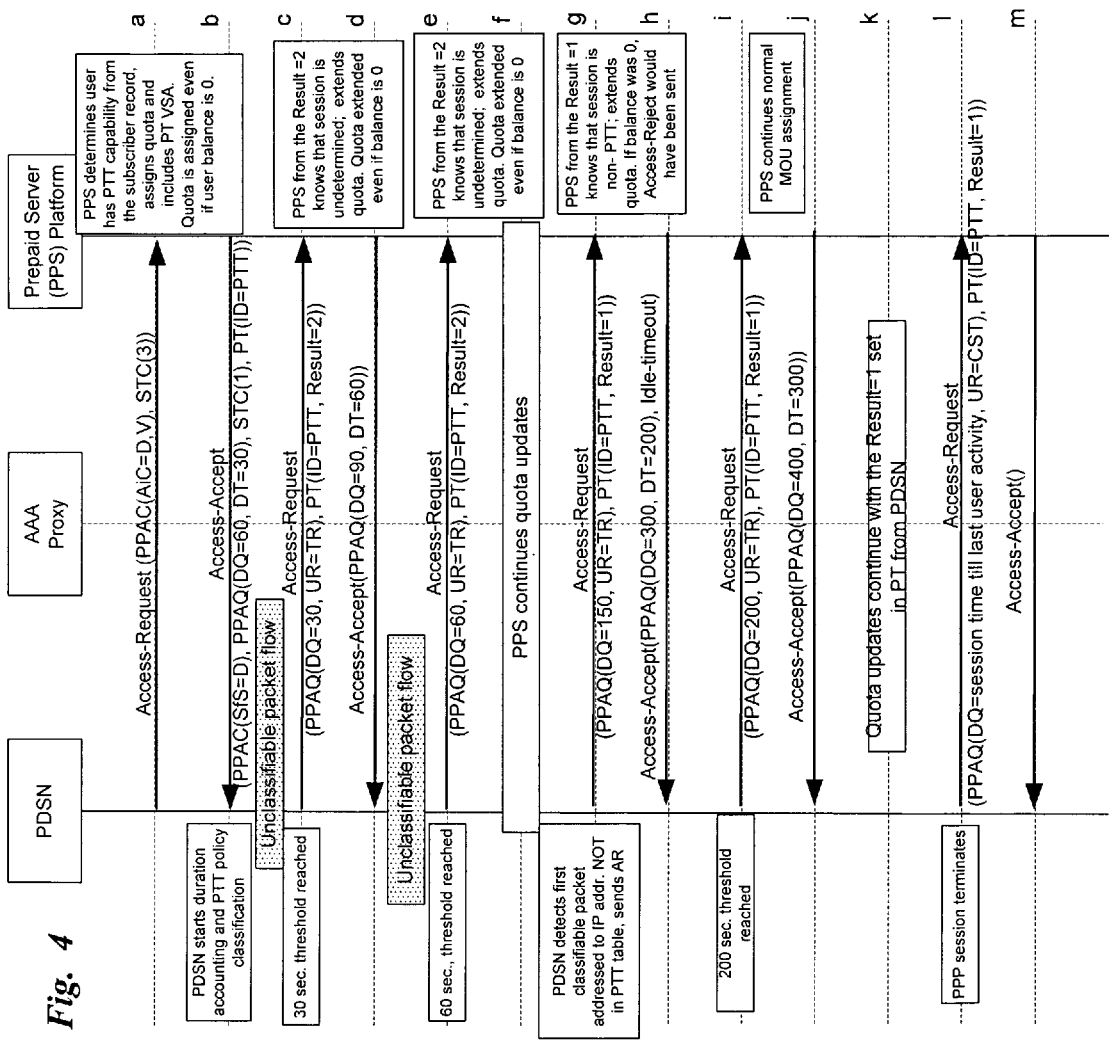

FIG. 4 is a call flow diagram for a prepaid packet data session, in which the PPC classifies the session after expiration of the initial threshold expiry, again using duration based charging.

Figure 5:
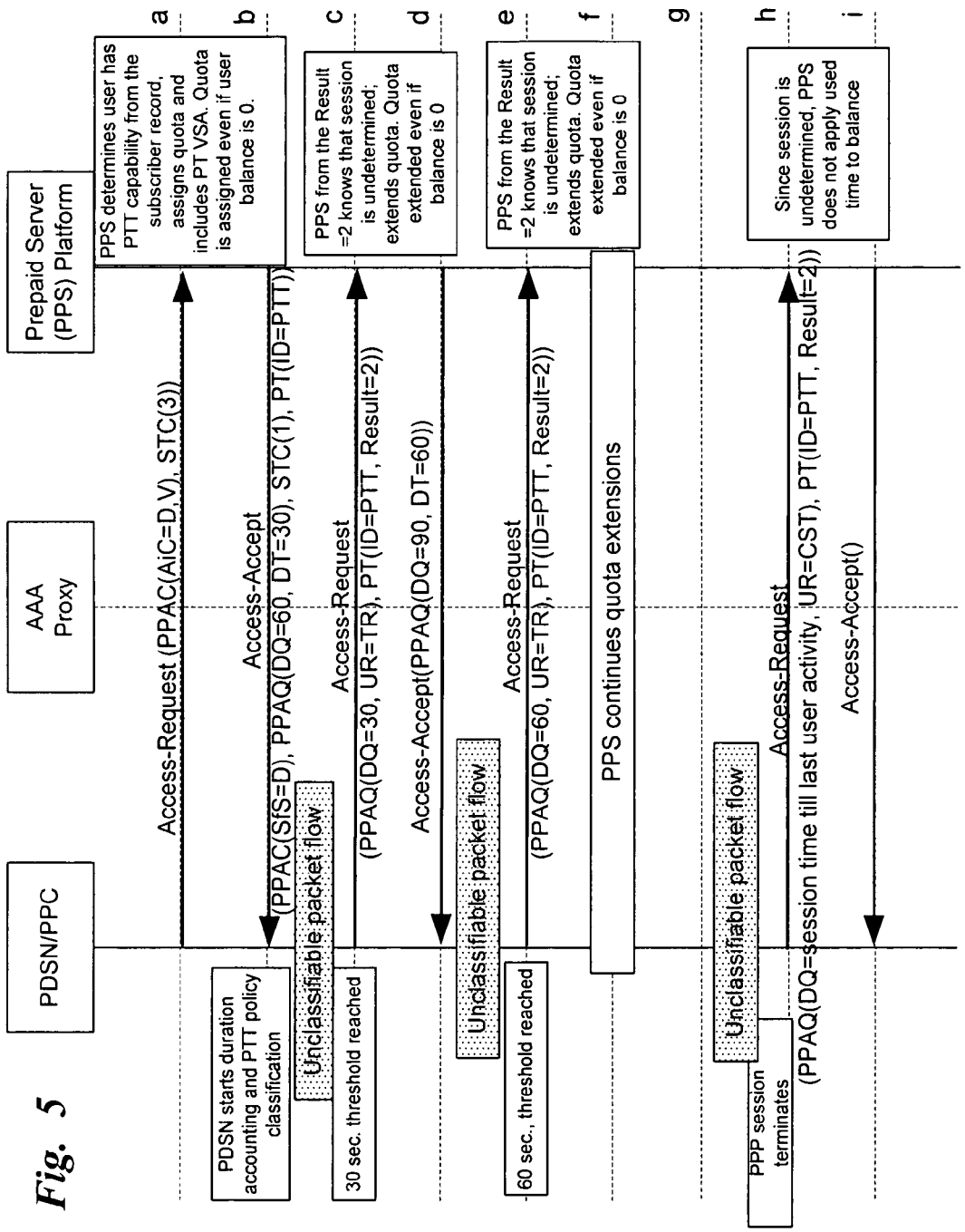

FIG. 5 is a call flow diagram for a prepaid packet data session, in which the PPP session from the PTT subscriber remains unclassified. Since the session classification is undetermined, the PPS does not apply used time to the prepaid account balance.

Figure 6:
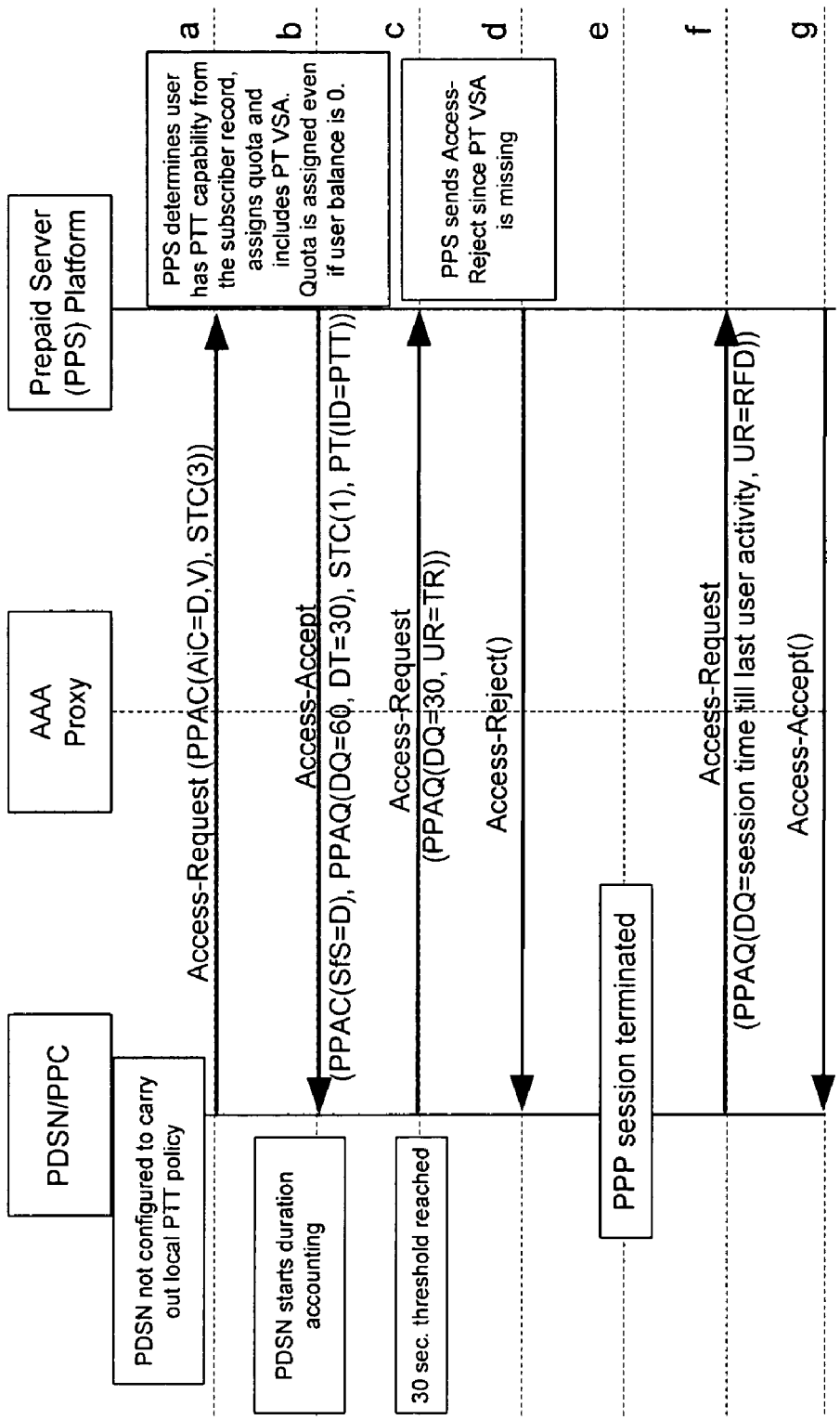

FIG. 6 is a call flow diagram for a prepaid packet data session, in which the PDSN or other network node serving session as the PPC is not configured to support local policy. Upon determining that the PPC is not configured to support the local policy, the session is terminated, because there is no means involved in the routing of the data packets for the session that can monitor packets and classify the session.

In the detailed implementation discussed herein, a new RADIUS attribute is used for the differentiation mechanism. This attribute indicates to the PPC the local policy to use for a data session. It can be included by the PPS in the initial and online Access-Accept messages to identify the local policy to be used for the data session. The PPC includes this VSA in online Access-Requests to pass result or error values to the PPS. The meaning of the error and result values will depend on the policy in use.

PolicyOFF (Poff):
Sub-Type (=2): Sub-Type for PolicyOFF attribute
Length: length of PolicyOFF attribute (=2 octets)
PolicyOFF (Poff):
The optional PolicyOFF Sub-Type is used to turn a local policy OFF or report that the local policy has been turned OFF. If this subtype is sent by the PPS, it signals to the PPC that the identified local policy should be turned OFF. If this subtype is sent by the PPC, it informs the PPS that the identified policy is turned OFF. Absence of this subtype indicates that the policy is ON. If this subtype is present then the Error and Result subtypes shall not be present.

Error (E):
Sub-Type (=3): Sub-Type for Error attribute
Length: length of Error attribute (=4 octets)
Result (R):
Sub-Type (=4): Sub-Type for Result attribute
Length: length of Result attribute (=4 octets)
Result (R):
The optional Result Sub-Type, generated by the prepaid client, conveys information on policy-specific results. The meaning of these Result values depends on the policy in use. Format of the value is a 16-bit unsigned integer with a range of values from 0-65535.

The optional Error Sub-Type, generated by the prepaid client, indicates the error that the PPC encountered. Format of

TABLE 1

PolicyType (PT) VSA format

| 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
|---|---|---|---|---|---|---|---|---|---|---|---|---|---|---|---|---|---|---|---|---|---|---|---|---|---|---|---|---|---|---|---|
| Type | | | | | | | | | | | | Length | | | | | | | | | | | Vendor-ID | | | | | | | | |
| Vendor-ID (cont) | | | | | | | | | | | | | | | | Vendor-Type | | | | | | | | | Vendor-Length | | | | | | |
| Sub-Type (=1) | | | | | | | | | | | | Length | | | | | | | | | | | Value(Identifier) | | | | | | | | |
| Sub-Type (=2) (PolicyOFF) | | | | | | | | | | | | Length | | | | | | | | | | | Sub-Type(=3) | | | | | | Length | | |
| Value (Error) | | | | | | | | | | | | | | | | | | | | | | | Sub-Type(=4) | | | | | | Length | | |
| Value (Result) | | | | | | | | | | | | | | | | | | | | | | | | | | | | | | | | |

Table 1 above shows the formatting and fields of the new PT RADIUS attribute.

The fields of this attribute include:
Type: 26
Length: variable, greater than 8
Vendor-ID: 12951 (VZW)
Vendor-Type: 5
Vendor-Length: variable, greater than 2
Sub-Type (=1): Sub-Type for Identifier attribute
Length: length of Identifier attribute (=4 octets)
Identifier(ID):
The ID subtype is always present. It identifies the policy for the data session. Format of this subtype is a 16-bit unsigned integer with a range of values from 0-65535. Currently assigned values are as follows:
Value 0=PTT
Value 1=PTT with Filtering the value is a 16-bit unsigned integer with a range of values from 0-65535. The possible values are as shown below in Table 2.

TABLE 2

| Error Sub-Type for Error (E) | |
|---|---|
| 0 | Identified policy cannot be activated or is not recognized |
| Others | Meaning of these values depends on the policy in use. |

The RADIUS messages in which the PolicyType VSA may be included includes an Access-Accept message sent from the PPS to the AAA server. Table 3 below shows the fields of that message.

TABLE 3

Access-Accept Message

| Attribute | M/O | Type | Notes |
|---|---|---|---|
| prepaidAccountingQuota (PPAQ) | O | 26/90 | Shall be present when the PPC is directed to provide prepaid accounting for the session |
| prepaidAccountingCapability (PPAC) | O | 26/91 | Shall be present when the PPC is directed to provide prepaid accounting for the session |
| SessionTerminationCapability (STC) | M | 26/88 | Indicates preferred resource management mechanism |
| PolicyType (PT) | O | 26/5 (VZW) | Shall be present when a PPC local policy needs to be used |
| prepaidTariffSwitch(PTS) | O | 26/98 | |
| Class | O | 25 | |
| MIP Lifetime | O | 26/92 | |
| Remote IPv4 Address | O | 26/59 | |
| Remote IPv6 Address | O | 26/70 | |
| Remote Table Index | O | 26/71 | |
| Event-Timestamp | O | 55 | If present, shall not be used for protection against replay attacks (i.e. message shall not be silently discarded if timestamp is not current) |

Another RADIUS message that may include PolicyType VSA is an online Access-Request message sent from the PPC to the PPS via the AAA server. As noted above, the AAA server acts as a proxy for online Access-Requests identified by the presence of the PPAQ VSA and the Service-Type attribute set to "Authorize Only." Note: If Message-Authenticator is present, it should be calculated on hop-by-hop basis. Table 4 below shows the fields of the online Access-Request message as used in relation to a prepaid data service.

TABLE 4

Online Access-Request Message (Prepaid)

| Attribute | M/O | Type | Notes |
|---|---|---|---|
| User-Name | M | 1 | Contains the NAI: MDN@realm |
| NAS-IP-Address Or NAS-IPv6-Address | M | 4 95 | Contains the PPC (PDSN/HA) IP address |
| NAS-Identifier | M | 32 | Contains the PPC (PDSN/HA) Identifier |
| Service-Type | M | 6 | Shall be set to "Authorize Only" |
| Framed-IP-Address Or Framed-Ipv6-Prefix | M | 8 97 | IP address of the prepaid customer |
| Correlation ID | M | 26/44 | |
| prepaidAccountingQuota (PPAQ) | M | 26/90 | |
| PolicyType | O | 26/5 (VZW) | May be present when a local policy is being used at the PPC. Note: Shall be present when the "PTT" local policy is being used |
| PrepaidError(PE) | O | 26/7 (VZW) | May be present |
| Home Agent | O | 26/07 | |
| Service Option | O | 26/16 | |
| Foreign Agent Address | O | 26/79 | |
| prepaidTariffSwitch (PTS) | O | 26/98 | |
| Service Reference ID | O | 26/94 | |
| Calling-Station-ID | O | 31 | |
| Message-Authenticator | M | 80 | |
| Framed-Interface-ID | O | 96 | |
| Event-Timestamp | O | 55 | If present, shall not be used for protection against replay attacks (i.e. message shall not be silently discarded if timestamp is not current) |

Another RADIUS message that may include PolicyType VSA is an online Access-Accept message sent from the PPS to the PPC via the AAA server. The AAA server proxies this message to the PPC on receiving it from PPS. Note: If Message-Authenticator is present, it should be calculated on hop-by-hop basis. Table 5 below illustrates the format of the online Access-Accept message.

TABLE 5 online Access-Accept message

| Attribute | M/O | Type | Notes |
|---|---|---|---|
| User-Name | O | 1 | Shall be included when either PPAQ, PT, or PTS is present |
| Framed-IP-Address Or Framed-Ipv6-Prefix | O | 8 97 | Shall be included when either PPAQ, PT, or PTS is present |
| Correlation ID | O | 26/44 | Shall be included when either PPAQ, PT, or PTS is present |
| prepaidAccountingQuota (PPAQ) | O | 26/90 | Shall be present for quota assignments |
| PolicyType(PT) | O | 26/5 (VZW) | May be present when a PPC local policy is being used |
| Idle-Timeout | O | 28 | Shall be included when session has been classified as non-PTT and is being charged by duration |
| prepaidTariffSwitch (PTS) | O | 26/98 | |
| Message-Authenticator | M | 80 | |
| Framed-Interface-ID | O | 96 | |
| Event-Timestamp | O | 55 | If present, shall not be used for protection against replay attacks (i.e. message shall not be silently discarded if timestamp is not current) |

As noted, the node classifying the session may implement an associated filtering function. Essentially, packets for any application that does not correspond to the session classification are discarded. The following are the local policy requirements that are to be followed for the 'PTT with filtering' Policy, i.e. when the Identifier Subtype in the VzW PolicyType VSA is set to 'PTT with filtering' (1):

a. As soon as a session changes classification from 'undetermined' to 'PTT,' any packet in that data session destined to or received from an IP address not present in the 'PTT' or 'UCA' table will be filtered and silently discarded.
   b. As soon as a session changes classification from 'undetermined' to 'non-PTT,' any packet in that data session destined to or received from IP address in the PTT table will be filtered out and silently discarded.

c. Note that the above filtering rules shall not apply when the session classification is 'undetermined.' d. In cases when incoming or outgoing packets are silently discarded, it will not account as traffic activity or 'last user activity,' i.e. in regards to the idle-timeout timer and for determining the prepaid session time it will appear as if the filtered packet were not sent or received.

As will be apparent from the above discussion, aspects of the accounting techniques are implemented by a PDSN and the PPS platform or by other network elements that may be involved in session establishment and accounting and therefore can perform the desired policy selection, session classification and attendant application of the appropriate accounting policy. The hardware platforms of the PDSN and the PPS are known, and suitable equipment is already deployed in many advanced networks. The added functionality related to session classification and policy application may be implemented in such known or existing hardware, typically, via an upgrade of the programming or software of the appropriate network elements. Those skilled in the art will understand that new versions of the PDSN and PPS or new equipment for providing these functionalities can include hardware or software to support the session classification and related functions discussed herein.

Hence aspects of the techniques discussed in this case encompass network hardware and programmed equipment as well as software programming, for performing the relevant functions. A software or program product may take the form of code or executable instructions for causing a PDSN, the PPS or other programmable equipment to perform the relevant steps, where the code or instructions are carried by or otherwise embodied in a medium readable by a computer or other machine. Instructions or code for implementing such operations may be in the form of computer instruction in any form (e.g. source code, object code, interpreted code, etc.) stored in or carried by any readable medium.

Terms relating to computer or machine "readable medium" for bearing programming refer to any medium that participates in providing code or instructions to a processor for execution. Such a medium may take many forms, including but not limited to, non-volatile media, volatile media, and transmission media. Non-volatile media include, for example, optical or magnetic disks, such as any of the storage devices in the elements of the network illustrated in FIG. 1. Volatile media include dynamic memory, such as main memory. Transmission media include coaxial cables; copper wire and fiber optics including the wires that comprise a bus within a computer system. Transmission media can also take the form of electric or electromagnetic signals, or acoustic or light waves such as those generated during radio frequency or infrared data communications. In addition to storing programming in network or system elements, various forms of computer readable media may be involved in carrying one or more sequences of one or more instructions to a processor for execution, for example, to install appropriate software in a PDSN or PPS server in the network 11.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

Authentication, Authorization, and Accounting (AAA)
Base Station Controller (BSC)
Base Transceiver System (BTS)
Code Division Multiple Access (CDMA)
Corresponding Node (CN)
Duration Quota (DQ)
Evolution, Data Only (EVDO)
Foreign Agent (FA)
Global Service for Mobile (GSM)
General Packet Radio Service (GPRS)
Home Agent (HA)
Home Location Register (HLR)
Internet Protocol (IP)
Kilo-Bytes (KB)
Minutes of Use (MOU)
Mobile IP (MIP)
Mobile Directory Number (MDN)
Mobile Switching Center (MSC)
Mobile Telephone Switching Office (MTSO)
Network Address Identification (NAI)
Packet Control Function (PCF)
Packet Data Serving Node (PDSN)
Point-to-Point Protocol (PPP)
Policy Type (PT)
Prepaid Accounting Quota (PPAQ)
Prepaid Accounting Capability (PPAC)
Prepaid Client (PPC)
Prepaid Data (PPD)
Prepaid Error (PE)
Prepaid Service (PPS)
Prepaid Tariff Switch (PTS)
Push-to-Talk (PTT)
Quality of Service (QoS)
Radio Access Network (RAN)
Remote Authentication Dial-User Service (RADIUS)
Session Termination Capability (STC)
Service Control Point (SCP)
Short Message Service (SMS)
Simple IP (SIP)
Transmission Control Protocol (TCP)
Transmission Control Protocol/Internet Protocol (TCP/IP)
Un-classifiable Address (UCA)
Universal Mobile Telephone Service (UMTS)
Usage Data Record (UDR)
Vender Specific Attribute (VSA)
Visited Location Register (VLR)
Voice over IP (VoIP)
Volume Quota (VQ)
Wireless Local Area Network (WLAN)

What is claimed is:

1. A method of providing a prepaid packet data communication service to a mobile station via a wireless communication network, the method comprising:

in response to a message requesting packet data communication service for the mobile station, obtaining an access acceptance from a server maintaining prepaid accounting information, the access acceptance identifying one of a plurality of available accounting policies for application to prepaid communication service for the mobile station;

establishing a packet data communication session for the mobile station through the wireless communication network and beginning measurement of duration of the established session;

monitoring packet data communication for the mobile station via the established communication session to classify the session as one of a plurality of types under the identified accounting policy, wherein the monitoring and classification of the packet data communications for the mobile station comprises:
  (a) comparing destination addresses of packets from the mobile station to known network addresses associated with a predetermined application type;
  (b) comparing destination addresses of packets from the mobile station to known network addresses that are not classifiable with regard to a specific application type; and
  (c) classifying the session based on the results of the comparisons,
  wherein the classifying step comprising classifying the session upon first detecting a packet from the mobile station having a destination address that does not match one of the addresses that are not classifiable, wherein:
    (i) the session is classified as one corresponding to the predetermined application type if the destination address, in the first detected packet from the mobile station having a destination address that does not match one of the addresses that are not classifiable, matches one of the known network addresses associated with the predetermined application type; and
    (ii) the session is classified as one corresponding to an application type different from the predetermined application type if the destination address, in the first detected packet from the mobile station having a destination address that does not match one of the addresses that are not classifiable, does not match one of the known network addresses associated with the predetermined application type;

reporting the classification of the session to the server; and upon termination of the session, reporting the measured duration of the established session to the server, for appropriate prepaid accounting in accord with the reported classification.

2. The method of claim 1, wherein the establishment of the session comprises:
  assigning an Internet Protocol (IP) address to the mobile station; and
  informing the mobile station of the assigned IP address, for use by the mobile station for the duration of the established session.

3. The method of claim 2, wherein the assigning of the IP address provides a Simple IP address assignment from a Packet Data Serving Node (PDSN), serving the mobile station in its current location.

4. The method of claim 2, wherein the assigning of the IP address provides a Mobile IP (MIP) address assignment from a home agent node of the network.

5. The method of claim 1, further comprising:
  monitoring packets communicated for the mobile station via the established communication session after classifying the session as one of the types under the identified accounting policy; and
  discarding any of the monitored packets that to do not match the classification.

6. A product comprising: executable instructions for causing a programmable network element to implement the method as recited in claim 1, and a machine readable storage medium bearing the instructions.

7. A Packet Data Serving Node (PDSN) or Home Agent (HA), for operation in the wireless communication network, programmed for performing the steps of the method of claim 1.

* * * * *